(12) United States Patent
Jamieson et al.

(10) Patent No.: US 8,838,761 B2
(45) Date of Patent: Sep. 16, 2014

(54) CLEAR CHANNEL REPORTING AND ASSISTING ORPHANED NODES IN A WIRELESS NETWORK

(75) Inventors: Phil A. Jamieson, Dorking (GB); David M. Avery, Woking (GB); Philip A. Rudland, Horley (GB); Adam C. R. Sexton, Leeds (GB)

(73) Assignee: Koninklijke Philips N.V., Eindhoven (NL)

( * ) Notice: Subject to any disclaimer, the term of this patent is extended or adjusted under 35 U.S.C. 154(b) by 956 days.

(21) Appl. No.: 12/280,995

(22) PCT Filed: Mar. 5, 2007

(86) PCT No.: PCT/IB2007/050704
§ 371 (c)(1),
(2), (4) Date: Aug. 28, 2008

(87) PCT Pub. No.: WO2007/099517
PCT Pub. Date: Sep. 7, 2007

(65) Prior Publication Data
US 2009/0043879 A1  Feb. 12, 2009

(30) Foreign Application Priority Data
Mar. 3, 2006 (EP) .................................... 06110636

(51) Int. Cl.
| | |
|---|---|
| *G06F 15/173* | (2006.01) |
| *H04L 12/703* | (2013.01) |
| *H04L 12/701* | (2013.01) |
| *H04W 72/02* | (2009.01) |
| *H04L 12/26* | (2006.01) |
| *H04W 48/08* | (2009.01) |
| *H04W 72/08* | (2009.01) |
| *H04W 72/04* | (2009.01) |
| *H04W 76/02* | (2009.01) |
| *H04W 24/00* | (2009.01) |
| *H04W 28/04* | (2009.01) |

(52) U.S. Cl.
CPC ................ *H04L 45/00* (2013.01); *H04L 45/28* (2013.01); *H04W 48/08* (2013.01); *H04W 72/085* (2013.01); *H04W 72/02* (2013.01); *H04L 43/0817* (2013.01); *H04W 72/0406* (2013.01); *H04W 76/02* (2013.01); *H04W 24/00* (2013.01); *H04W 28/04* (2013.01)
USPC ............ 709/223; 709/220; 709/221; 709/222

(58) Field of Classification Search
USPC .......................................... 709/220, 221, 222
See application file for complete search history.

(56) References Cited

U.S. PATENT DOCUMENTS 6,047,175 A  *  4/2000  Trompower ................ 455/452.1
7,323,991 B1 *  1/2008  Eckert et al. ................ 340/572.1
(Continued)

FOREIGN PATENT DOCUMENTS

EP        1187504 A2    3/2002

OTHER PUBLICATIONS

"Broadband Radio Access Networks (BRAN)" ETSI TR 101 683 VI.1.1, Feb. 8, 2000, pp. 1-20, XP002176358 paragraph [6.3.2.2].

*Primary Examiner* — Harunur Rashid
(74) *Attorney, Agent, or Firm* — Larry Liberchuk

(57) ABSTRACT

In a wireless network, a device regularly communicates with at least one other node or device: generally this is its parent. If a problem with communication is detected, the device is preferably able to autonomously carry out a procedure to reacquire the network. In one embodiment, if a device is unable to communicate, it enters a temporary failsafe mode until that problem can be rectified. The device is suitably able to carry out a survey of local conditions in order to assist both it and the network to find a suitable alternative channel and, if a device is unable to immediately reconnect it broadcasts the result of its survey, the Network Environment Status (NES) message, in the hope that another device on the network will hear it. This Status message may then be used by the network to select an alternative channel.

8 Claims, 8 Drawing Sheets

(56) References Cited

U.S. PATENT DOCUMENTS

| | | | |
|---|---|---|---|
| 7,787,450 B1* | 8/2010 | Chan et al. | 370/389 |
| 2003/0054827 A1* | 3/2003 | Schmidl et al. | 455/450 |
| 2003/0181213 A1 | 9/2003 | Sugar et al. | |
| 2004/0152416 A1 | 8/2004 | Dahl | |
| 2005/0017843 A1* | 1/2005 | Fernandez | 340/7.3 |
| 2005/0181823 A1 | 8/2005 | Haartsen | |
| 2006/0014536 A1 | 1/2006 | Demirhan et al. | |
| 2006/0092896 A1* | 5/2006 | Mulligan et al. | 370/338 |
| 2006/0203837 A1* | 9/2006 | Shvodian | 370/445 |
| 2008/0194241 A1* | 8/2008 | Kretz | 455/417 |
| 2008/0209297 A1* | 8/2008 | Chandra et al. | 714/748 |

* cited by examiner

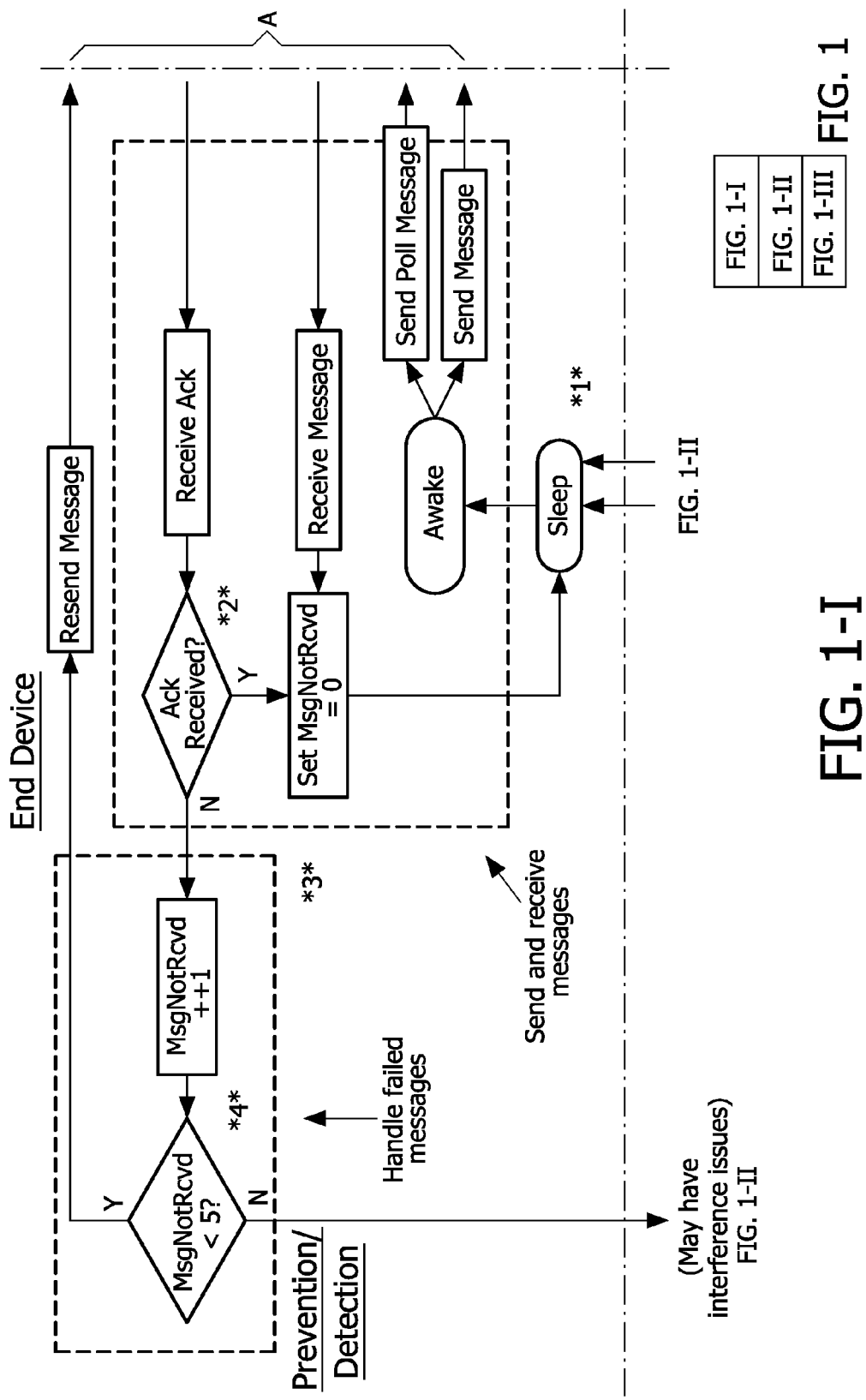
FIG. 1-I

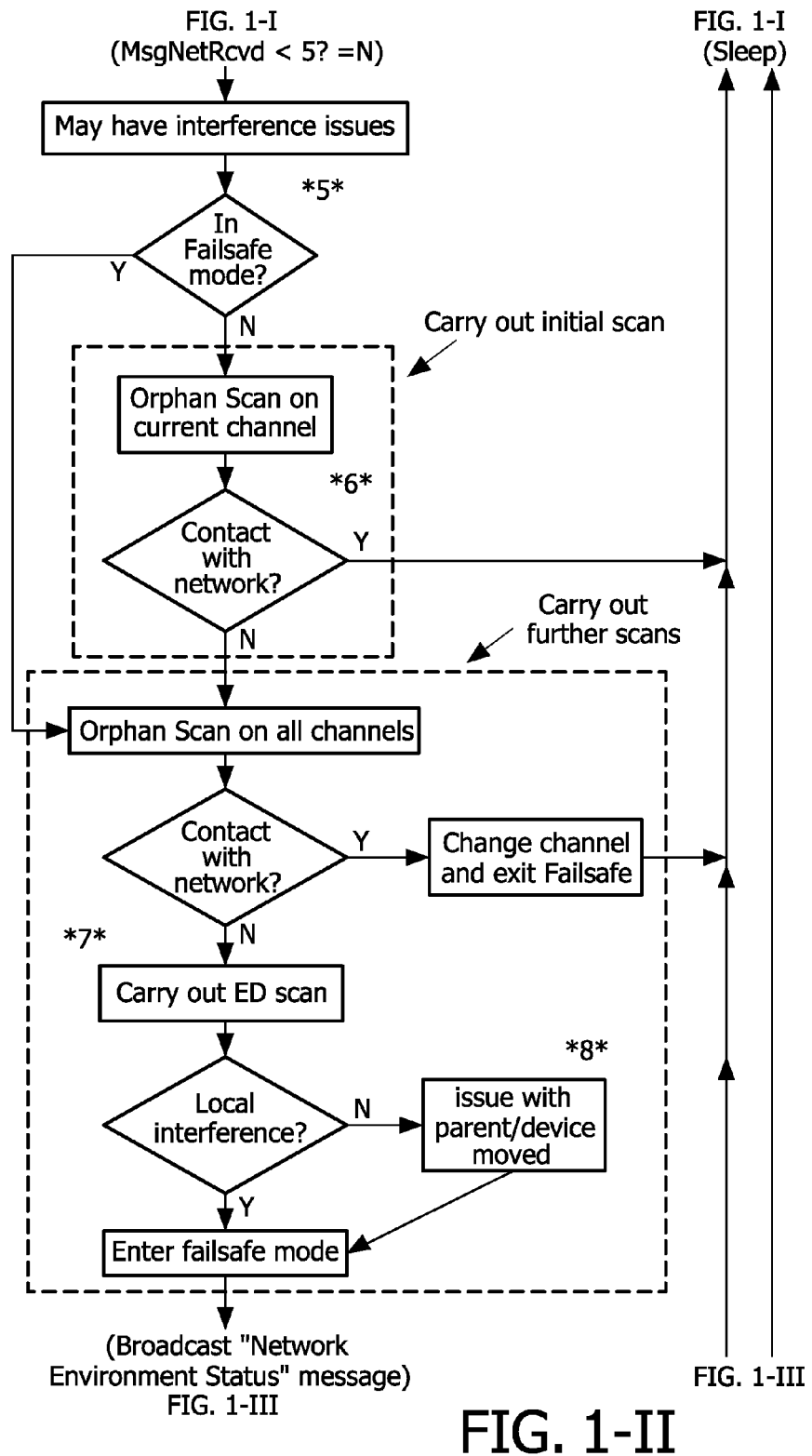
FIG. 1-II

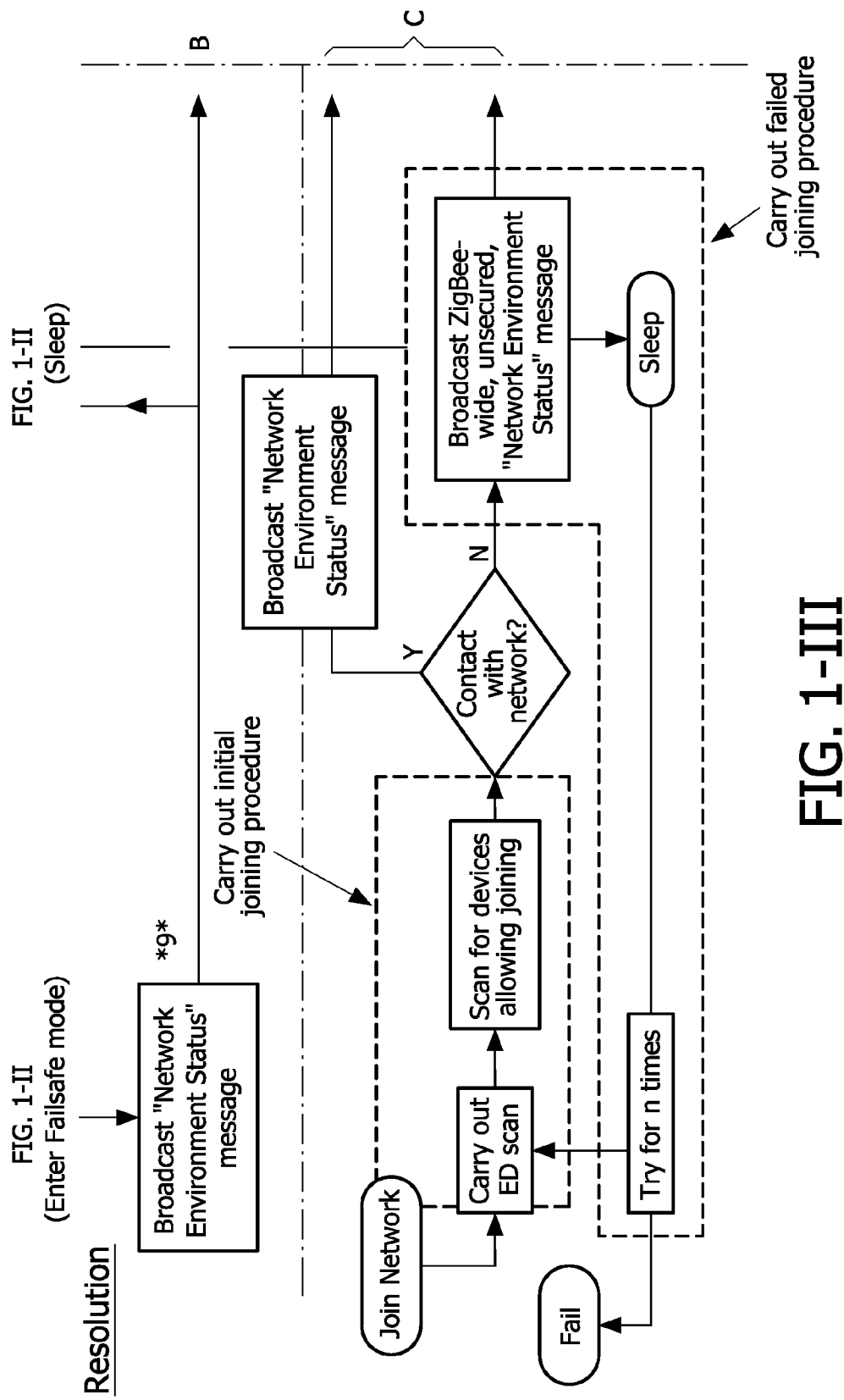

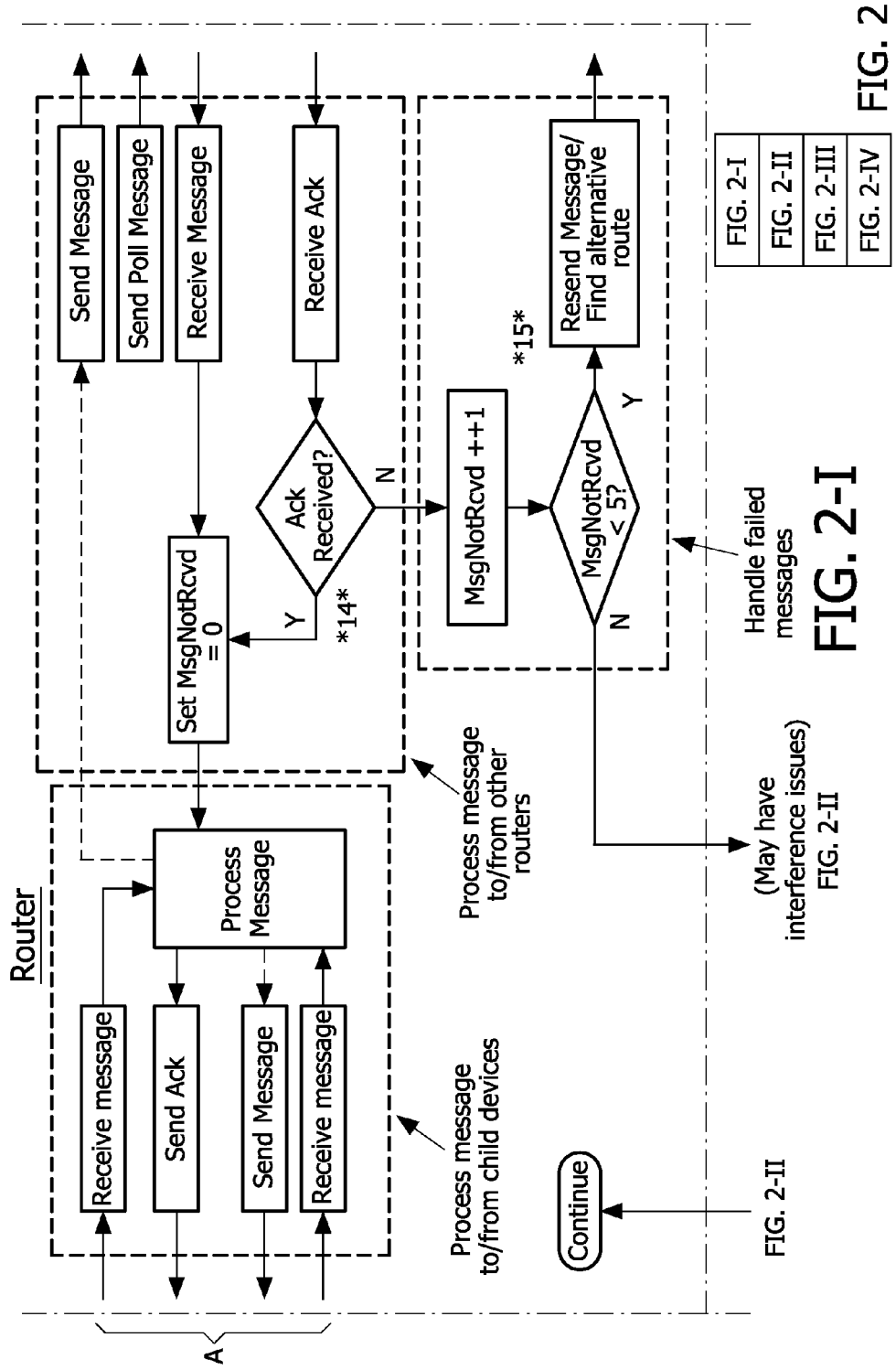

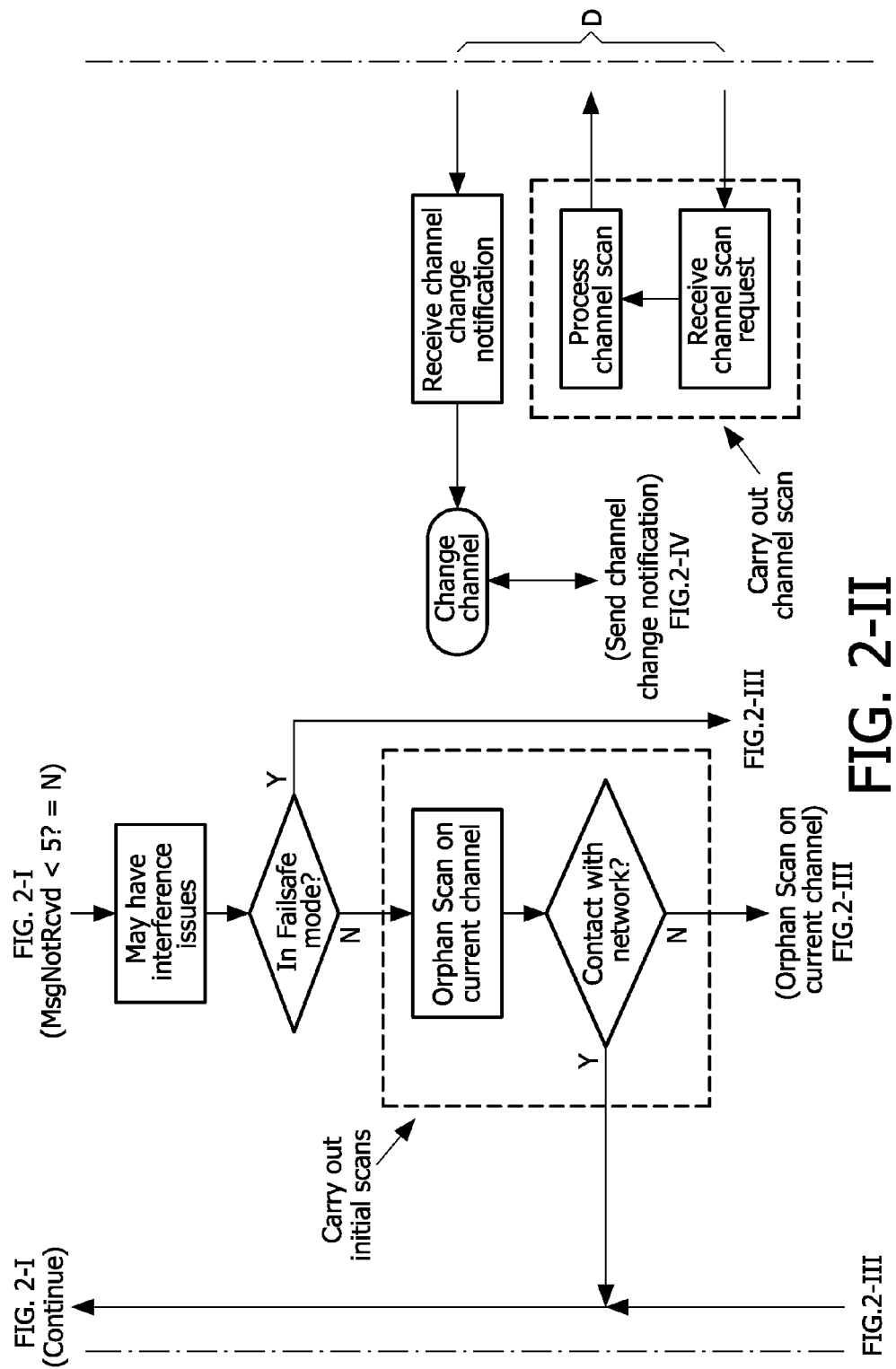
FIG. 2-II

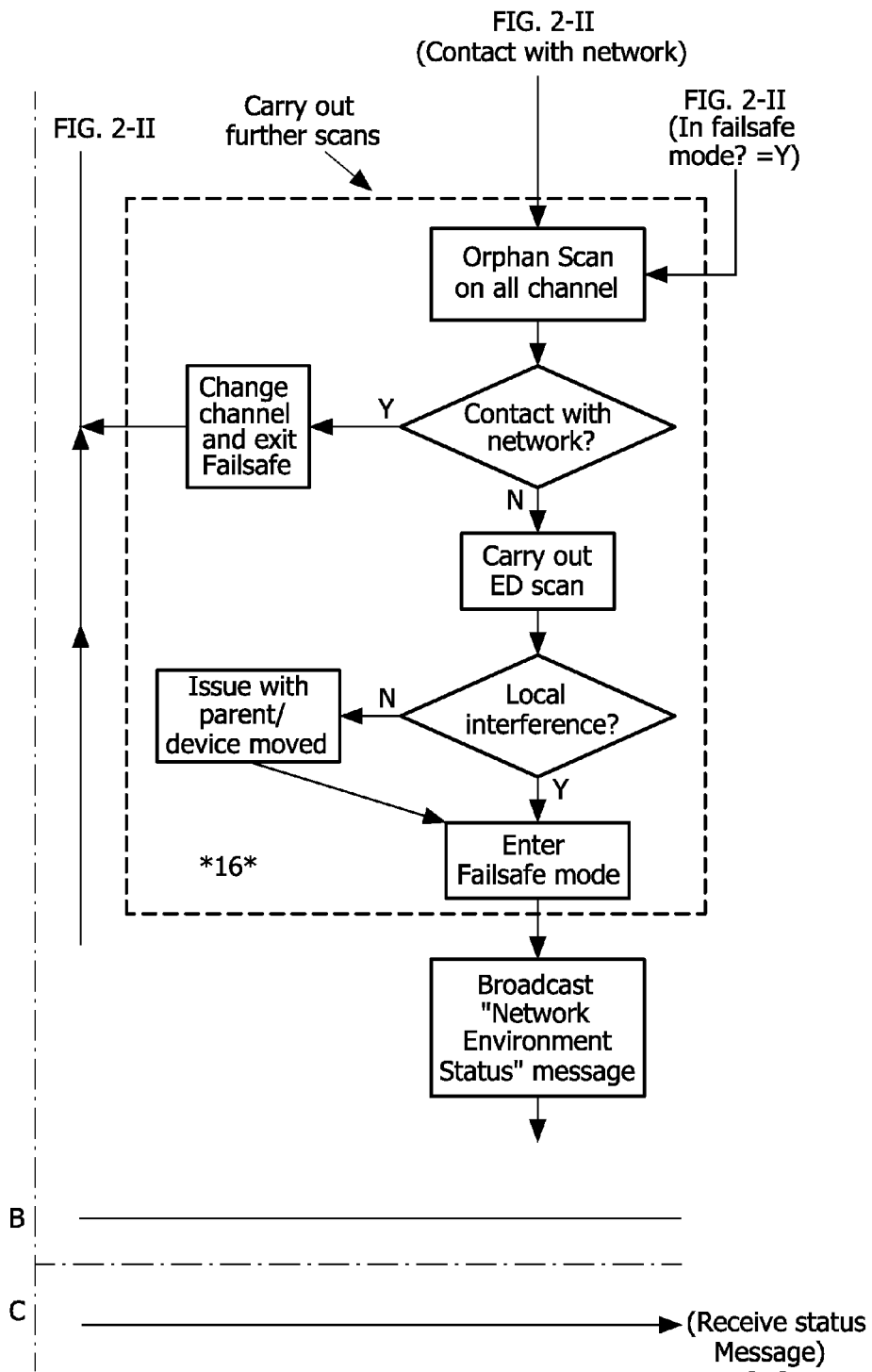
FIG. 2-III

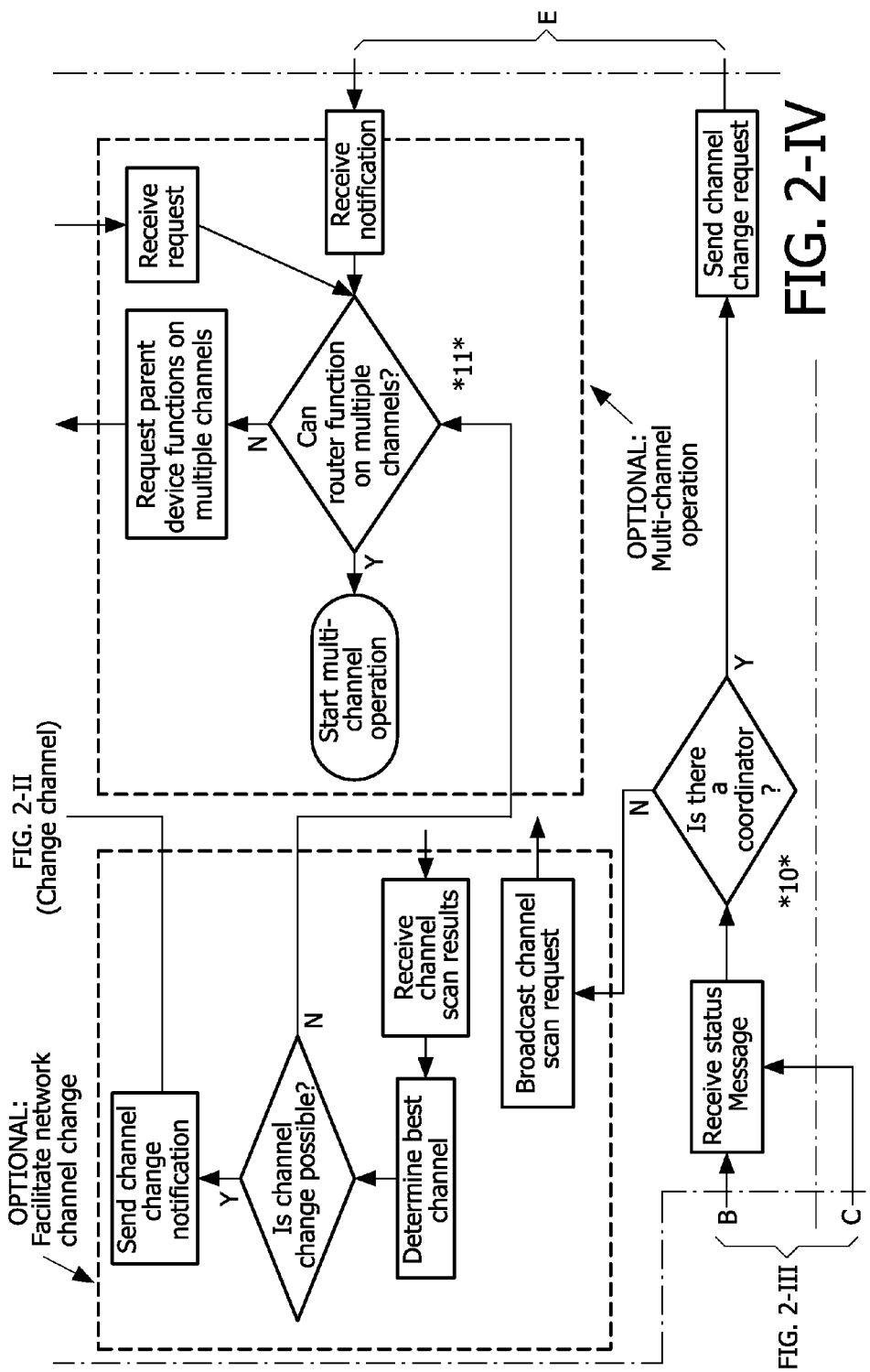

CLEAR CHANNEL REPORTING AND ASSISTING ORPHANED NODES IN A WIRELESS NETWORK

FIELD OF THE INVENTION

The present invention relates to determining operating information in a network and, in particular (but not exclusively), to methods and systems for determining such information in a multi-hop wireless network.

BACKGROUND OF THE INVENTION

A suitable format for a communication in a wireless network is the ZigBee Specification (053474r06) for low cost, low power wireless radio links, as defined by the ZigBee Alliance. It uses functionality described in IEEE Standard 802.15.4-2003. Communication between nodes takes place over one of a number of "physical channels". The 2.4 GHz communication band contains 16 separate 802.15.4 channels, so a number of Personal Area Networks (PANs) can operate simultaneously with each on its own channel and so not interfering with each other.

It is possible for more than one PAN to use a single channel, especially if they are a long distance apart (>10-100 m away), or if both have fairly low usage rates (low duty cycle).

A problem with ZigBee is that WiFi devices also operate in the 2.4 GHz band, and WiFi traffic can interfere with ZigBee traffic. WiFi messages can be transmitted at a much higher power level, and a WiFi logical channel is as wide as several ZigBee logical channels.

In order for two such systems to coexist it is beneficial to be able to work out what channels are clear, and get the interfered-with network (e.g. the ZigBee PAN) to operate on these channels.

ZigBee devices have the ability to assess which channels are clear—they carry out an "Energy detection scan", which returns a list containing the background power level on each available channel. It would therefore be possible for the PAN Coordinator to carry out a scan and simply use the clearest channel, but this is not very good for a large network, as channel conditions vary with location, and at a different point in the network the selected channel may be unusable.

Ideally, the PAN Coordinator (or other commissioning tool) would contact each device in the network, and request the results of an energy scan. Unfortunately this is only possible if reliable communications are operational between all devices, in which case no change is necessary anyway. Currently no good solution exists for getting energy levels from devices for which there is not already a reliable connection.

The network also needs to handle the situation where a device is orphaned (unable to communicate with the network) due to a local communication issue. This might be, for example, due to a WiFi router having been setup nearby. An orphaned device needs to somehow re-establish communication with the network to inform the PAN Coordinator that it is unable to reliably communicate on the current channel.

SUMMARY OF THE INVENTION

It is an object of the present invention to improve on the known art.

In accordance with a first aspect of the present invention there is provided a device operable to wirelessly communicate with at least one node in a wireless network, the device being arranged to:

detect a problem with communication;
carry out a survey of local conditions according to predetermined criteria and generate a network environment status message derived from the result of the survey; and
broadcast the network environment status message.

In a ZigBee network, a device regularly communicates with at least one node on the PAN: generally this is its parent. If a problem with communication is detected, the device is preferably able to autonomously carry out a procedure to reacquire the network. In an embodiment to be described, if a device is unable to communicate, it enters a temporary failsafe mode until that problem can be rectified. The device is suitably able to carry out a survey of local conditions in order to assist both it and the network to find a suitable alternative channel and, if a device is unable to immediately reconnect it broadcasts the result of its survey, the Network Environment Status (NES) message, in the hope that another device on the network will hear it.

Advantages of this approach include:
Minimum numbers of messages are sent ensuring a network is not flooded as a result of trying to fix a communication issue.
Battery power is conserved as much as possible.
When a device is orphaned, it is able to operate autonomously both in its procedure for rejoining the network and in its use of a failsafe mode.

Optionally, to assist devices wishing to rejoin the network, network nodes operating as Routers may be temporarily able to operate on multiple channels to allow them to act as a bridge between the orphaned nodes and the rest of the network. With such an arrangement, if there is no overall control or coordination node for the network, a Router may communicate with other Routers to facilitate a network channel change.

Aspects of the invention are valid for all three types of Zigbee device—End Device, Router and Coordinator—and the following description of embodiments describes the procedure each such device type may suitably follow should it become disconnected from the rest of the network.

BRIEF DESCRIPTION OF THE DRAWINGS

Embodiments of the invention will now be described, by way of example only, and with reference to the accompanying drawing, in which:

FIG. 1 is an annotated flowchart illustrating procedures for addressing communications problems within an end device in a wireless network;

FIG. 2 is an annotated flowchart illustrating procedures for addressing communications problems within a router in a wireless network.

DETAILS OF THE INVENTION

Figure 3:
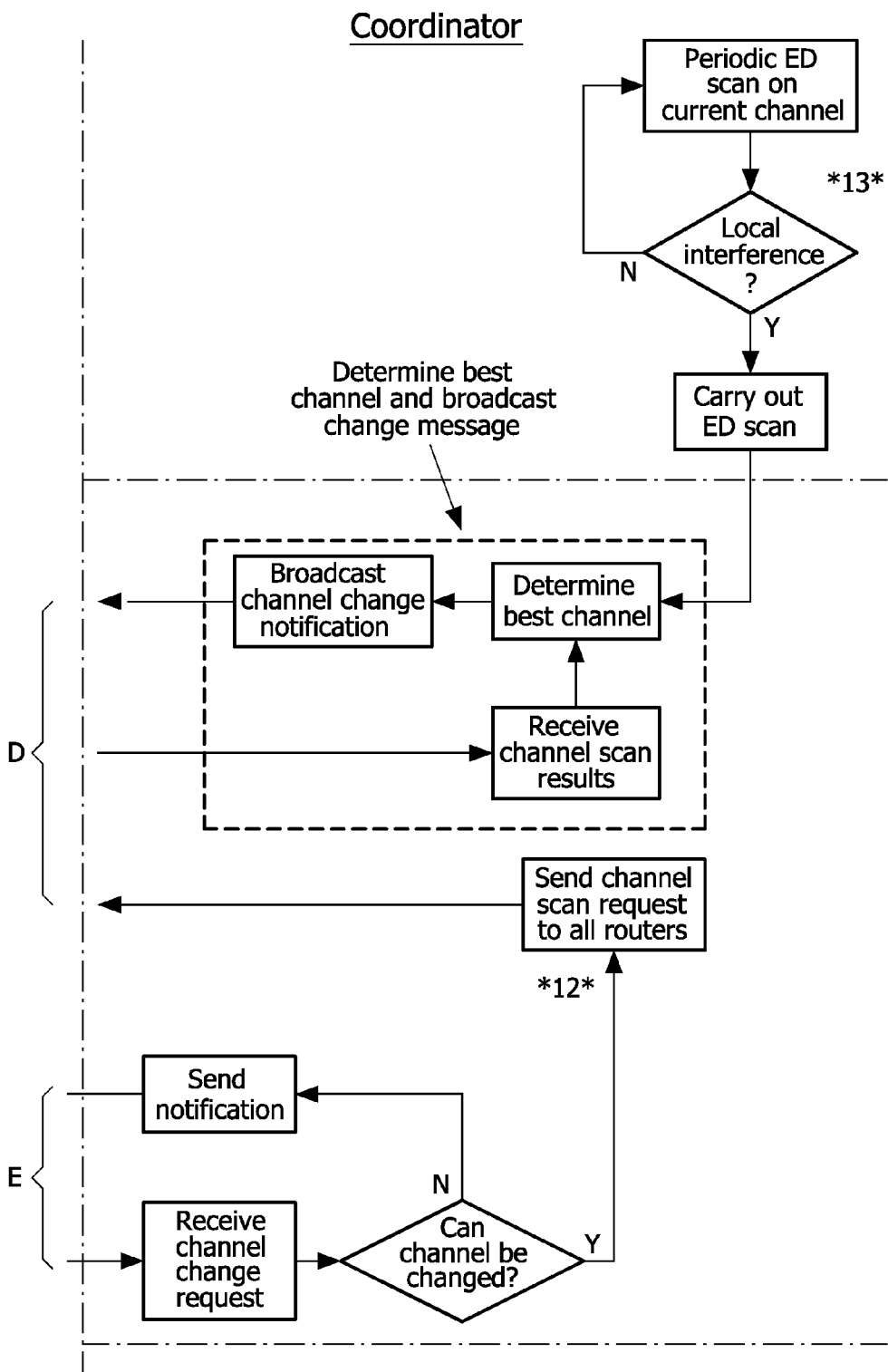
FIG. 3 is an annotated flowchart illustrating procedures for addressing communications problems within a coordinator node in a wireless network.

The flowcharts of FIGS. 1 to 3 (which link to a single flowchart) show subsidiary steps of the overall process grouped together and numbered 1 to 16. The correspondingly-numbered explanatory comments below detail the process features in each of the subsidiary steps.

Step 1. This is the default state for an End Device, illustrated on FIG. 1. If it is not sending or expecting to receive a message it sleeps. This allows it to conserve power. The sleep mode is stopped for instance when the end device has to send Message or Poll.

Step 2. When a poll or message is sent, the device waits for an acknowledgement indicating that the message was successfully received.

Step 3. The MsgNotRcvd (message not received) counter indicates the number of failed message transmissions. These are messages that have been sent for which acknowledgements are not received. The counter is used to indicate if there is a problem with communication. Here, the MsgNotRcvd counter is set to 0 when either an incoming message or an acknowledgement of a sent message is received. Receiving a message or an acknowledgement indicates successful communication.

Step 4. If the MsgNotRcvd counter is less than a given limit (for example 5) the device tries to resend the message. If it is 5 or above, this indicates a significant number of failed transmissions and that the device has probably become disconnected from the network. The procedure to resolve this should be started.

Step 5. When a node is orphaned, it should revert to a default fail-safe mode and then execute a strategy for rejoining the network. The exact behaviour of a device will be dependent on the function that device is intended to perform. If, for example, a light module was to become orphaned and unable to hear on/off requests it may remain in an on state until such time as it is able to communicate with the rest of the network.

Step 6. An orphan scan indicates to the network that a device has become orphaned and that it wishes to rejoin. This orphan scan can begin with a scan on the current channel for instance by transmission of a beacon or a special message on this channel. Then, if no concluding result has been found, the scan is carried out on all channels. If the rest of the network is contacted, the device will go onto the successful channel (i.e. stay on the current channel, or change to another), and go back into sleep mode on Step 1.

Step 7. An ED scan ("Energy Detection scan") determines the amount of local interference on all channels. From this, we are also able to determine the most optimal local channel for operation. This enables to obtain a transmission conditions report concerning the quality of each channel.

Step 8. If a device carries out an ED scan and no local interference is detected, there must be another problem that is affecting communication e.g.
 a) Parent device is blocked
 b) Large object has reduced operating range
 c) Parent device moved
 d) End Device moved
The End Device should broadcast its NES message (see Step 9) and then sleep before trying to reconnect again.

Step 9. In certain circumstances interference affects receiving but does not affect transmitting. If this is the case, a device that is affected by interference may be able to "shout" (broadcast) above the noise and still be possibly heard by another device on the network, which is not itself affected by the same interference. This is illustrated by the message B, on FIG. 1. When such a message is received, action is then taken by that Router to assist the device in rejoining the network.

The message that is sent (known as an Network Environment Status or NES message) will be comprised of data from the local Energy scan and will indicate the most favourable channel for communication, detected during the "orphan scan", at step 6.

Step 10. If there is a Coordinator in the network, the Router Device will send a channel change request to this coordinator including information from the NES message, as illustrated on FIG. 2. (Note: This is an optional step—if there is no Coordinator, the Router will facilitate the channel change itself, communicating with other Routers to determine the best new channel).

Step 11. If it is not possible to change the channel for the entire network, a parent device may be able to operate temporarily on multiple channels. This would mean that any orphaned devices would be able to rejoin the network using an alternative channel whilst the parent device continues to communicate with the rest of the network using the original frequency. A time-slicing strategy would be required to allow the parent to service messages on both channels.

In an extension to multi-channel operation, a device could request that its parent operates on both channels, thus enlarging the segment of the network using the new frequency. This request would be propagated as far as possible across the network with the aim of switching as many devices as possible over to the new channel. This would assist the coordinator in a complete network channel change.

Step 12. As depicted on FIG. 3 request is broadcast to all Routers to carry out a local ED scan, determine the best channel and report this back to the Coordinator. The Router may carry out the ED scan itself, or request information from its child devices to feed back to the Coordinator. Once the Coordinator receives the results of these scans (it may not wait for responses from all Routers) it determines the channel that is most suitable for the entire network and broadcasts a channel change notification.

Step 13. Moreover, the Coordinator periodically carries out an ED scan for instance on the current channel to detect if there is any local interference. Alternative techniques may be used for this.

Step 14. Router devices also check that sent messages are acknowledged, as illustrated on FIG. 2. Again a MsgNotRcvd counter indicates the number of messages that have not be successfully sent. This step can be similar to Step 2.

Step 15. If a message is not sent successfully, a Router will try and send it again. This may also require searching for an alternative route. This is particularly the case if the number of unsuccessful sending is not too high, e.g. below 5, otherwise it could cause a flooding of the network with these repeated messages, and a high power consumption.

Step 16. If a Router is unable to communicate, for instance if the number of unsuccessful sending is above a predetermined threshold, it also broadcasts an NES message, with a similar method as that of steps 6 to 9.

To implement the above, five new Zigbee messages are required:

| | |
|---|---|
| ChannelScanRequest | Broadcast to all Routers by the PAN Coordinator requesting them to carry out a local energy scan and return the results. |
| ChannelChangeRequest | Sent by a parent (Router) device to the PAN Coordinator requesting that it change network channel. |
| DenyChannelChange | Sent by the PAN Coordinator to a Router informing it that it is unable to change channel. |
| ChannelChangeNotification | Broadcast by the PAN Coordinator notifying all devices that they should change channel. |
| NES (Network Environment Status) | Broadcast by an orphaned device. This contains local environment data generated from an energy detect scan and indicates the most favourable channel. |

The easiest way to collect scan results is for a mobile commissioning tool to be carried around, and set to listen for broadcast messages. Any such messages received containing scan results would be logged and collated.

The problem with this is that it requires someone to carry the tool around. An alternative mechanism might be suggested, whereby any device that hears a broadcast message containing energy detection scan (NES) results is configured to send a copy of the data to its own PAN Coordinator. Clearly this would not work for devices in areas where the signal has rapidly deteriorated, as they too will not be able to communicate on the normal channel. However, devices at the very edge of the affected area (wherever the edge may be) are able to communicate but also are able to hear broadcast messages. Thus the indication that a certain channel is not usable by one or more devices on the PAN is correctly delivered back to the PAN Coordinator, which may take automated or semi-automated steps to rectify the situation.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The Applicants hereby give notice that new Claims may be formulated to such features and/or combinations of such features during the prosecution of the present Application or of any further Application derived therefrom.

The invention claimed is:

1. A method for communicating wirelessly from a device with at least one node in a wireless network, said method comprising, at the device:
   incrementing a counter by one when the device does not receive an acknowledgment to a message sent by the device;
   resetting the counter to zero when the acknowledgment or an incoming message is received by the device;
   detecting a problem with communication when the counter is above a predetermined threshold,
   carrying out a local orphan scan on a current channel by transmission of a beacon or a special message on the current channel to indicate to the network that the device has become orphaned and wishes to rejoin;
   when the local orphan scan is unsuccessful, carrying out a global orphan scan on all channels by transmission of the beacon or the special message on all the channels;
   when the global orphan scan is unsuccessful, carrying out an energy detection scan that includes determining a local interference on each available channel and includes determining the most optimal local channel for operation,
   generating a network environment status message based on the energy detection scan, and
   broadcasting the network environment status message.

2. The method as claimed in claim 1, further comprising, at the device, attempting to contact a non-predetermined device by broadcasting a message on a previously used channel.

3. The method as claimed in claim 2, wherein attempting to contact a non-predetermined device is operated before carrying out a survey.

4. The method as claimed in claim 2, further comprising, at the device, attempting to contact a non-predetermined device by broadcasting a message on at least one channel different from the previously used channel.

5. The method as claimed in claim 1, wherein if no interference is detected, the device indicates in a report that a non related to interference problem exists locally, and broadcasts this report.

6. The method as claimed in claim 1, further comprising, at a further device of the network, sending a channel change request in order to transfer communication to another channel.

7. The method as claimed in claim 6, further comprising communicating on two different channels.

8. A device, comprising a memory and processor, configured to wirelessly communicate with at least one node in a wireless network, the device being arranged to:
   increment a counter by one when the device does not receive an acknowledgment to a message sent by the device;
   reset the counter to zero when the acknowledgment or an incoming message is received by the device;
   detect a problem with communication when the counter is above a predetermined threshold;
   carry out a local orphan scan on a current channel by transmission of a beacon or a special message on the current channel to indicate to the network that the device has become orphaned and wishes to rejoin;
   when the local orphan scan is unsuccessful, carry out a global orphan scan on all channels by transmission of the beacon or the special message on all the channels;
   when the global orphan scan is unsuccessful, carry out an energy detection scan that includes determining a local interference on each available channel and includes determining the most optimal local channel for operation,
   generate a network environment status message based on the energy detection scan, and
   broadcast the network environment status message.

* * * * *